(12) United States Patent  
Makino et al.

(10) Patent No.: US 8,981,219 B2  
(45) Date of Patent: Mar. 17, 2015

(54) ELECTRICAL JUNCTION BOX

(71) Applicant: Yazaki Corporation, Tokyo (JP)

(72) Inventors: Masahiro Makino, Makinohara (JP); Takanori Kawai, Miyoshi (JP); Yoshiyuki Ishihara, Toyota (JP)

(73) Assignee: Yazaki Corporation, Tokyo (JP)

( * ) Notice: Subject to any disclaimer, the term of this patent is extended or adjusted under 35 U.S.C. 154(b) by 116 days.

(21) Appl. No.: 13/911,457

(22) Filed: Jun. 6, 2013

(65) Prior Publication Data

US 2013/0327566 A1   Dec. 12, 2013

(30) Foreign Application Priority Data

Jun. 7, 2012  (JP) ................................. 2012-129833

(51) Int. Cl.  
*H02G 3/08*  (2006.01)

(52) U.S. Cl.  
CPC ..................................... *H02G 3/088* (2013.01)  
USPC ............................................ 174/50; 439/535

(58) Field of Classification Search  
USPC ............. 174/50; 220/4.02; 439/535; 248/906  
See application file for complete search history.

(56) References Cited

U.S. PATENT DOCUMENTS

| | | | | |
|---|---|---|---|---|
| 5,864,091 A | * | 1/1999 | Sumida | ........................... 174/50 |
| 6,768,054 B2 | * | 7/2004 | Sato et al. | ...................... 174/50 |
| 7,109,416 B1 | * | 9/2006 | Reed | ................................ 174/50 |
| 7,291,784 B2 | * | 11/2007 | Moore et al. | .................... 174/50 |

FOREIGN PATENT DOCUMENTS

JP           3221363 B2      8/2001

* cited by examiner

*Primary Examiner* — Dhirubhai R Patel  
(74) *Attorney, Agent, or Firm* — Sughrue Mion, PLLC

(57) ABSTRACT

An electrical junction box includes an upper box section having an opened lower part, and a lower box section whose upper part is open and is mounted to the lower part of the upper box section, wherein the lower box section includes an abutment protrusion part which protrudes from an outer surface of the lower box section and has an abutment surface that abuts against an edge surface of the lower part of the upper box section when the lower box section is mounted to the upper box section. The abutment protrusion part includes an inclined surface at a place where the abutment protrusion part further extends outwards at least than an outer surface of the upper box section in a direction parallel with the abutment surface, the inclined surface connecting to the abutment surface and being inclined downwards from the abutment surface.

3 Claims, 7 Drawing Sheets

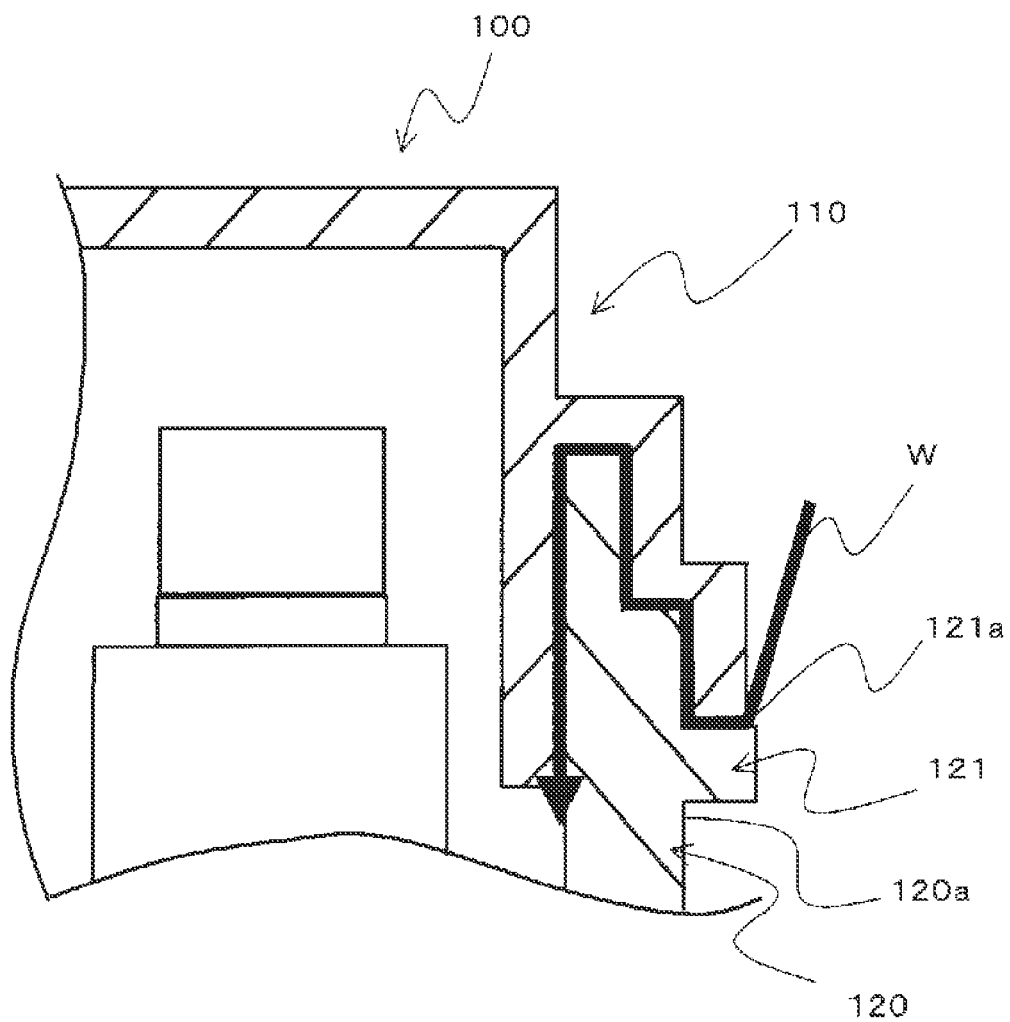

ELECTRICAL JUNCTION BOX

BACKGROUND OF THE INVENTION

1. Field of the Invention

The present invention relates, in general, to an electrical junction box having an upper box section and a lower box section which is mounted at a lower part of the upper box section.

2. Description of the Related Art

Conventionally, an electrical junction box, in which electrical components such as connectors, relays, fuses, or the like are intensively integrated, is mounted in an engine room to supply electric power to electronic appliances mounted in a vehicle, for example. Such an electrical junction box may include an upper box section whose lower end part is open, and a lower box section whose upper end part is open and is mounted at the lower end part of the upper box section. Proposed has been in Japanese Patent No. 3221363 for example an electrical junction box in which a plurality of walls is provided at a coupling part between the upper box section and the lower box section to prevent water from infiltrating therethrough.

The electrical junction box disclosed in Japanese Patent No. 3221363 includes an upper cover section (the upper box section) whose lower end part is open, and a lower cover section (the lower box section) that is a closed-bottomed box section which is mounted to the upper cover section to cover the lower end part of the upper cover section and has, on an outer surface thereof, a flange part (an abutment protrusion part) having an abutment surface that abuts against a lower edge of the upper cover when mounted thereto.

SUMMARY OF THE INVENTION

However, in the electrical junction box 100 disclosed in Japanese Patent No. 3221363, as shown in FIG. 7, if the abutment protrusion part 121 protruding from the outer surface 120a of the lower box section 120 further extends outwards than the upper box section 110 in a direction parallel with the abutment surface 121a, a problem may arise that water W infiltrates into the electrical junction box 100 through the abutment surface 121a, thereby degrading a waterproof function.

Accordingly, the present invention has been made keeping in mind the above problems, and one non-limited object of the present invention is to provide an electrical junction box capable of preventing water from infiltrating into the inside thereof through an abutment surface of a lower box section that comes into contact with a lower edge of an upper box section.

A first aspect of the present invention provides an electrical junction box, including: an upper box section having an opened lower part; and a lower box section whose upper part is open and is mounted to the lower part of the upper box section, wherein the lower box section includes an abutment protrusion part which protrudes from an outer surface of the lower box section and has an abutment surface that abuts against an edge surface of the lower part of the upper box section when the lower box section is mounted to the upper box section, wherein the abutment protrusion part includes an inclined surface at a place where the abutment protrusion part further extends outwards at least than an outer surface of the upper box section in a direction parallel with the abutment surface, the inclined surface connecting to the abutment surface and being inclined downwards from the abutment surface.

In a second aspect of the present invention, the electrical junction box may be configured so that a through-hole is formed that passes through the abutment protrusion part of the abutment protrusion part in a vertical direction.

In a third aspect of the present invention, the electrical junction box may be configured so that the inclined surface connects to the abutment surface at a position that is slightly inwards from the outer surface of the upper box section in the direction parallel with the abutment surface.

According to the electrical junction box of the first aspect of the present invention, when water is poured over a part of the abutment protrusion part that further protrudes outwards from the outer surface of the upper box section in the direction parallel with the abutment surface, the water is guided downwards from the lower box section while flowing along the inclined surface, or otherwise bounces out of the inclined surface outwards from the electrical junction box, thereby preventing water from infiltrating into the electrical junction box through the abutment surface of the lower box section which comes into contact with the lower edge of the upper box section.

According to the electrical junction box of the second aspect of the present invention, when water is poured over a part of the abutment protrusion part that further protrudes outwards from the upper box section in the direction parallel with the abutment surface, the water is guided downwards from the lower box section while passing through the through-hole, thereby further improving the waterproofing effect.

According to the electrical junction box of third aspect of the present invention, it is ensured that the inclined surface is formed at a part of the abutment protrusion part that further protrudes outwards from the upper box section in the direction parallel with the abutment surface.

BRIEF DESCRIPTION OF THE DRAWINGS

In the accompanying drawings:

FIG. 7 shows the related art.

DETAILED DESCRIPTION OF THE EXEMPLARY EMBODIMENTS

An embodiment of an electrical junction box will now be described in detail with reference to the accompanying drawings.

Embodiment

Figure 1:
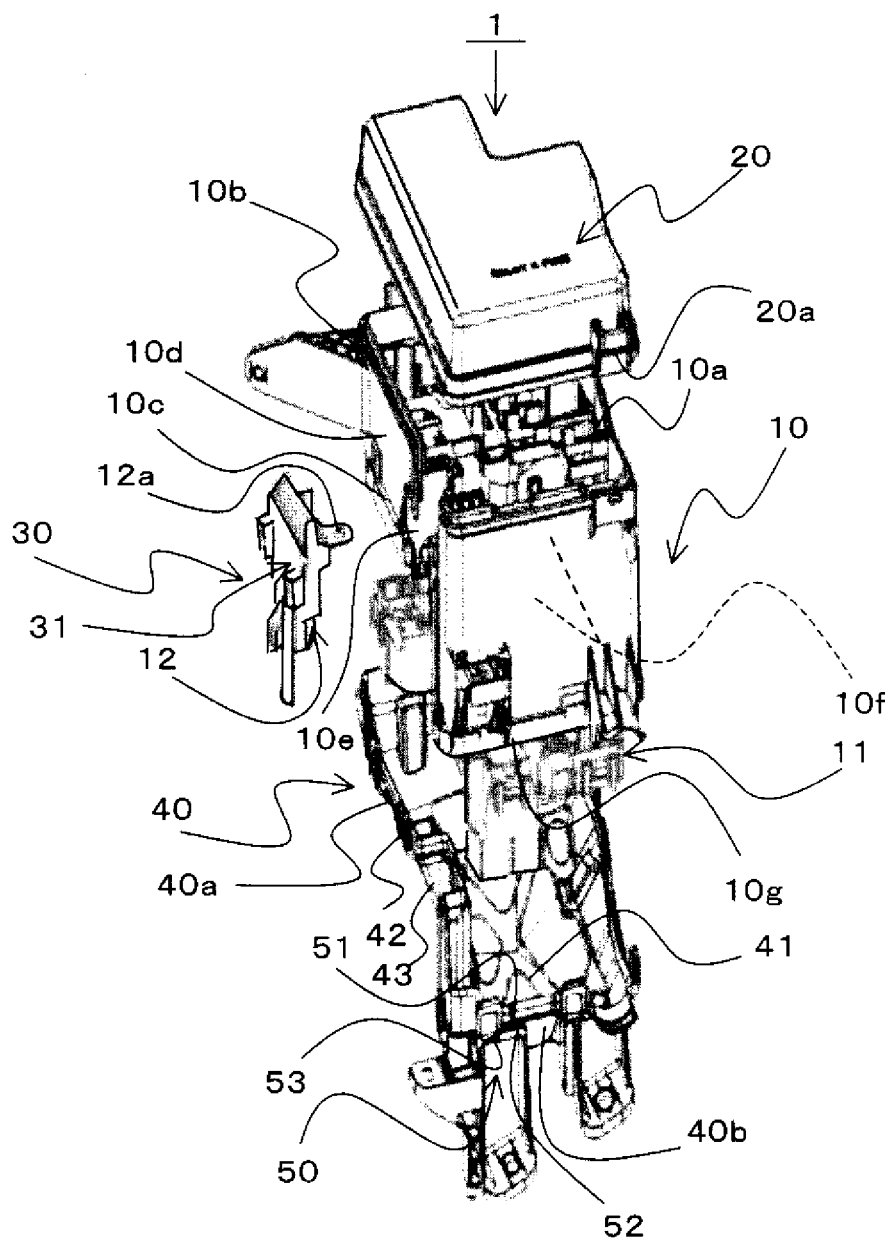
FIG. 1 is an exploded perspective view of an electrical junction box according to an embodiment of the present invention.
Figure 2:
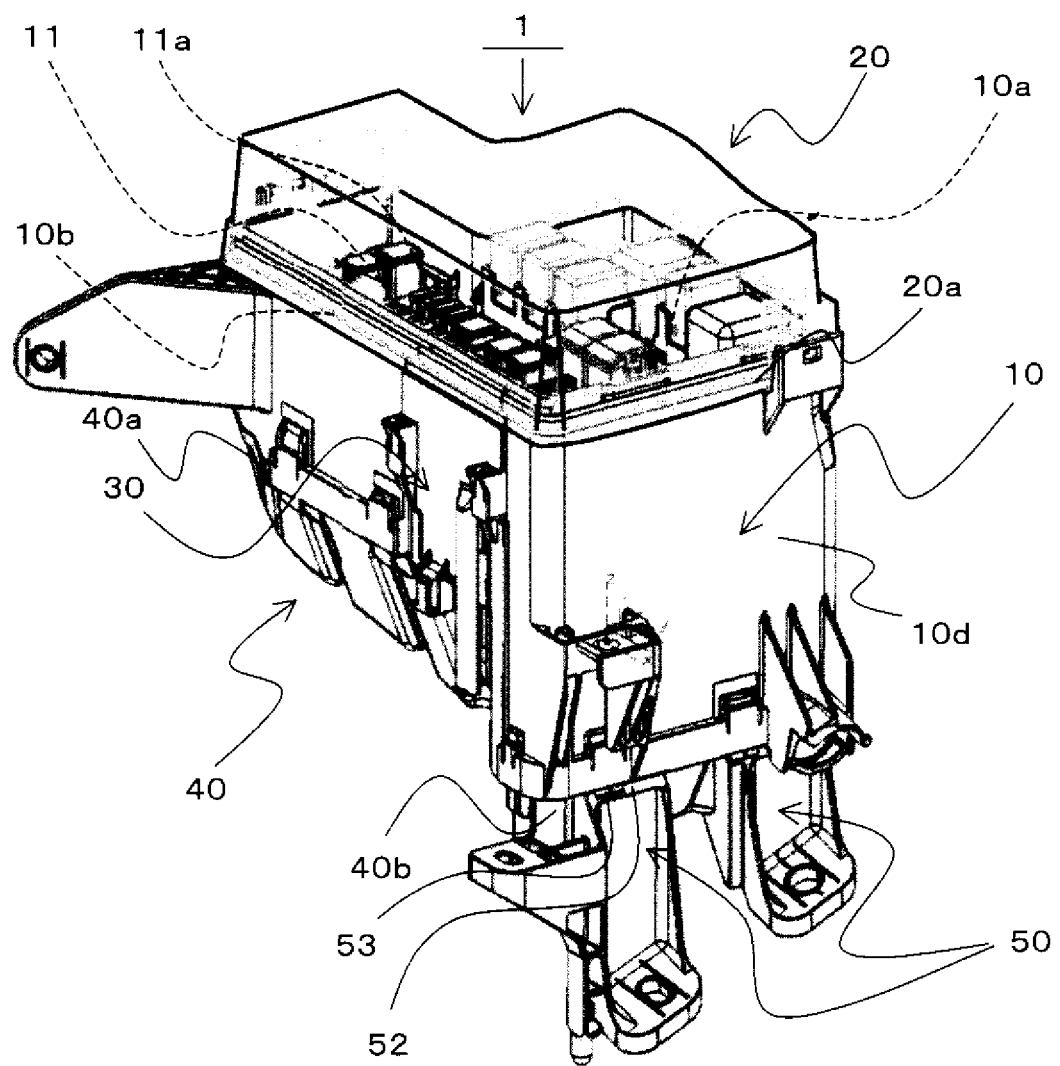
FIG. 2 is a perspective view of the electrical junction box shown in FIG. 1.

FIG. 1 is an exploded perspective view of an electrical junction box 1 according to an embodiment of the present invention. FIG. 2 is a perspective view of the electrical junction box 1 shown in FIG. 1.

Here, FIG. 2 shows the inside of the electrical junction box by penetrating an upper cover section 20.

Figure 3:
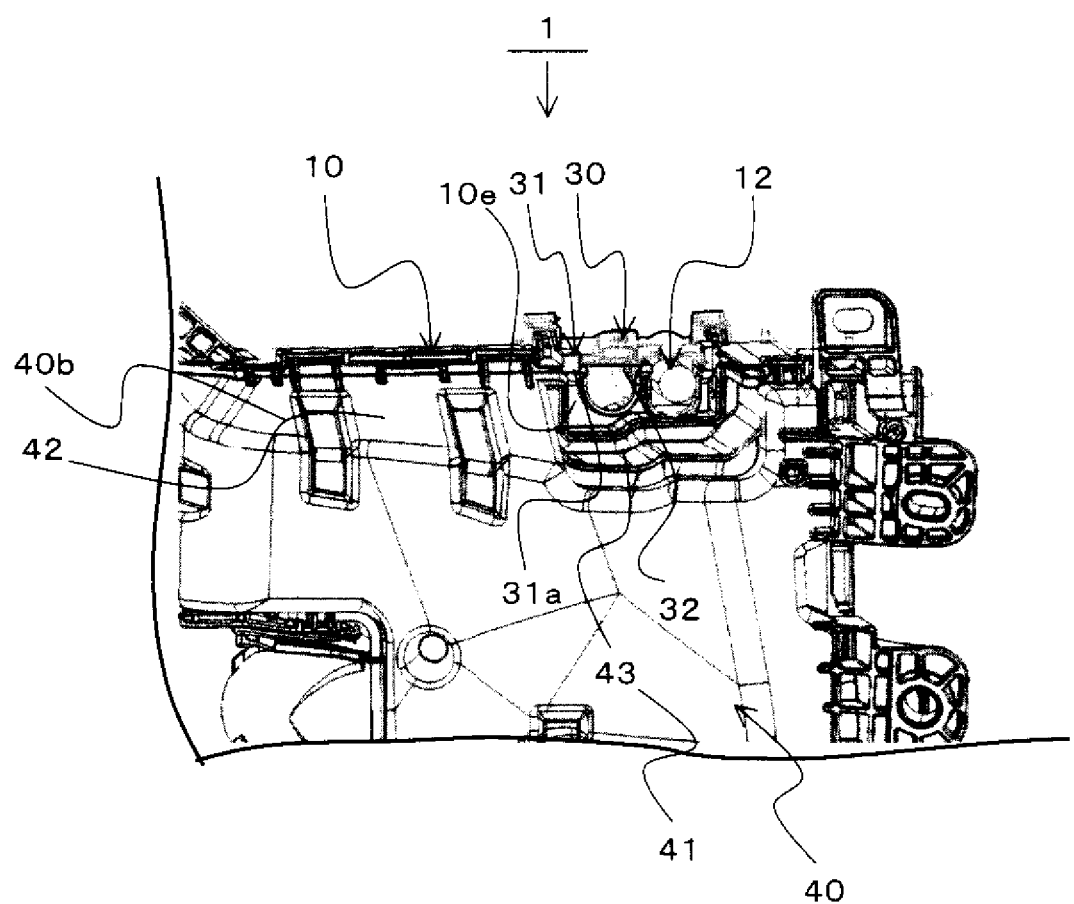
FIG. 3 is a lower view of the surroundings of a side cover section shown in FIG. 2 when viewed from a lower side thereof.
Figure 4:
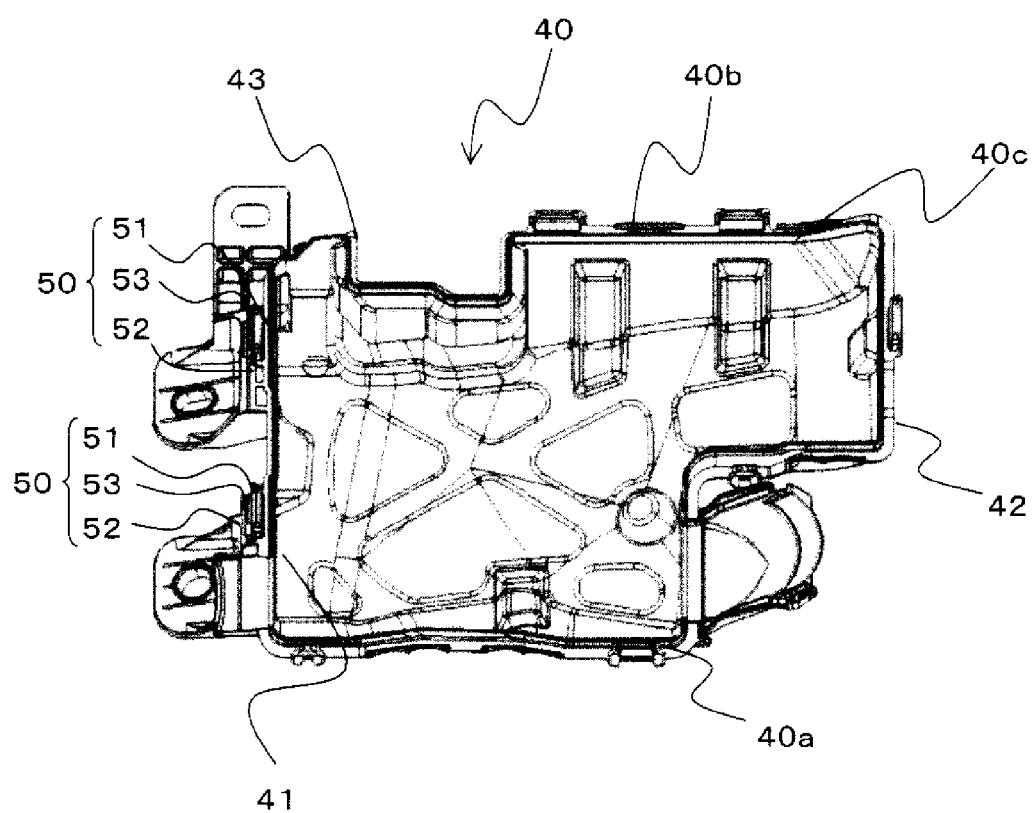
FIG. 4 is an upper view of a lower cover section when viewed from an upper side thereof.
Figure 5:
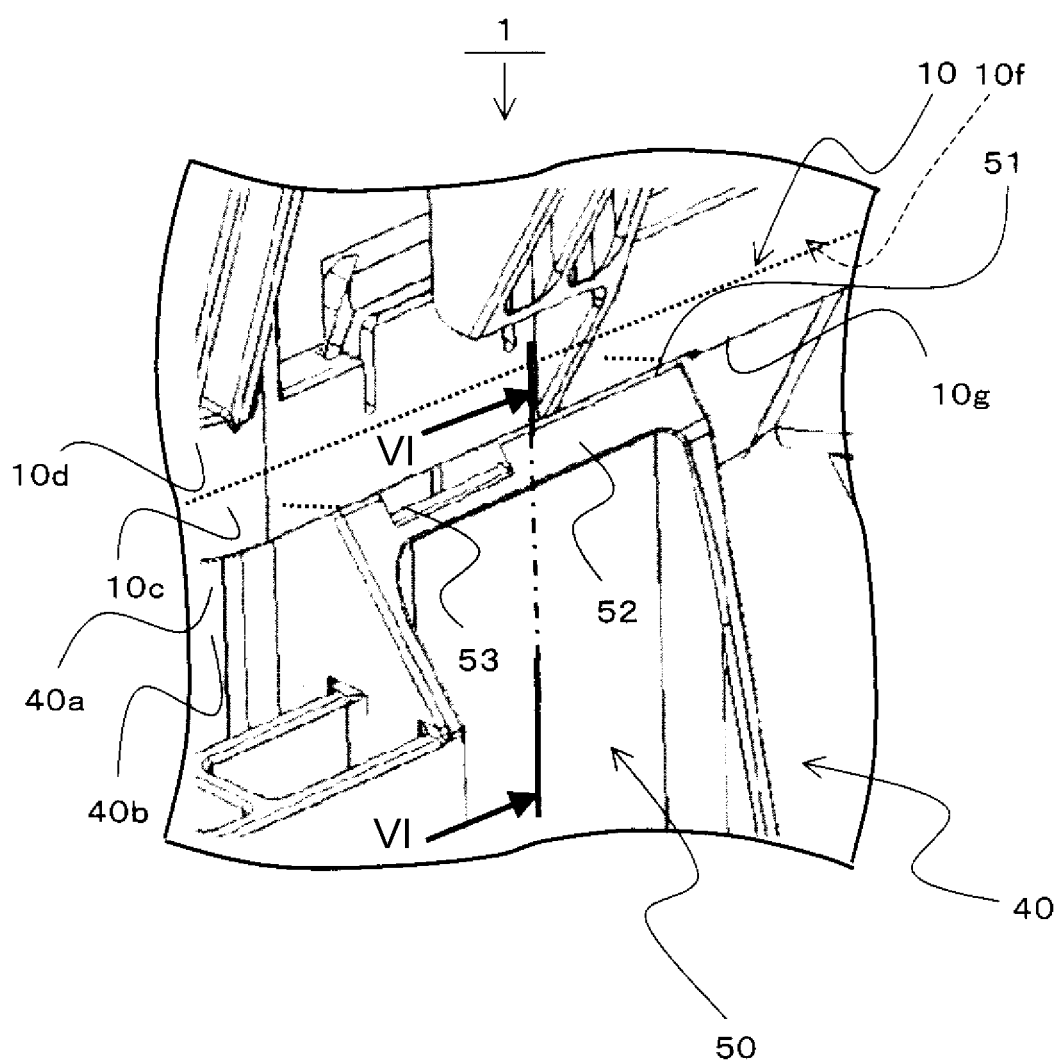
FIG. 5 is an enlarged view of the surroundings of an abutment protrusion part shown in FIG. 1.
Figure 6:
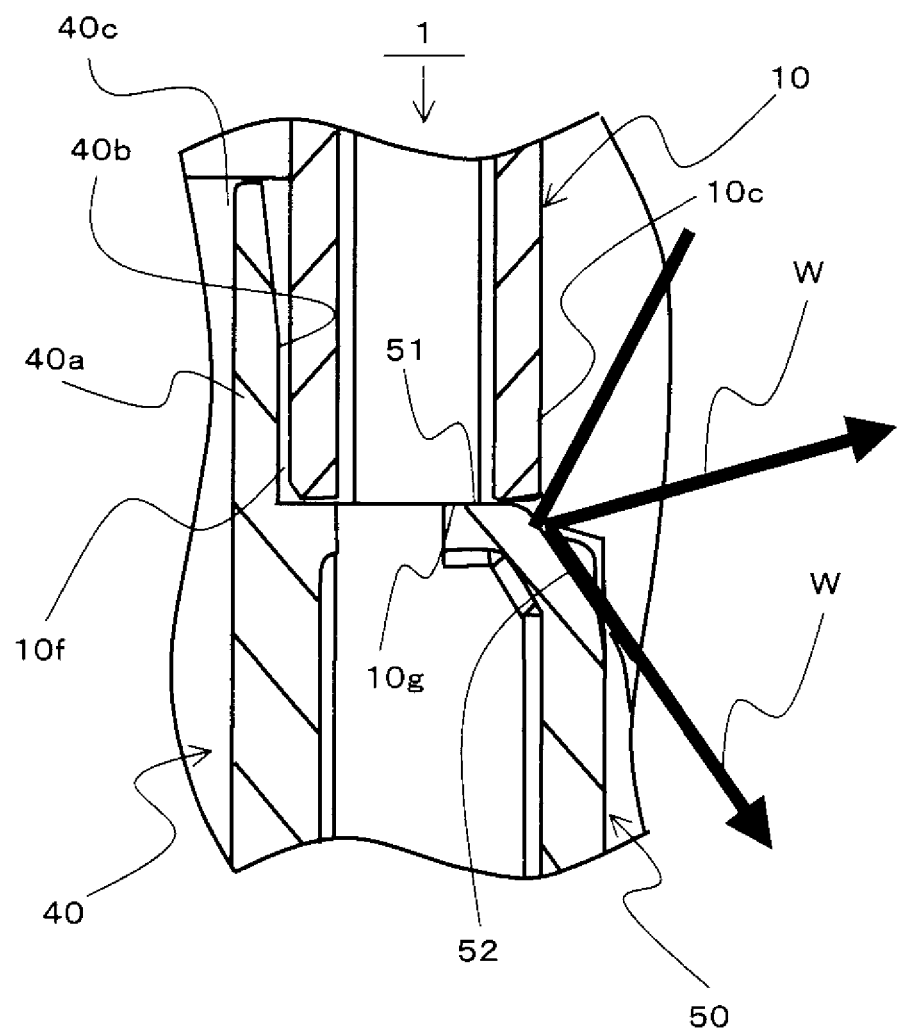
FIG. 6 is a sectional view of the surroundings of the abutment protrusion part, which is taken along line VI-VI of FIG. 5.

FIG. 3 is a lower view of the surroundings of a side cover section 30 shown in FIG. 2 when viewed from a lower side thereof. FIG. 4 is an upper view of a lower cover section 40 when viewed from a side of an upper surface 40c thereof. FIG. 5 is an enlarged view of the surroundings of an abutment protrusion part 50 shown in FIG. 1. FIG. 6 is a sectional view of the surroundings of the abutment protrusion part 50, which is taken along line VI-VI of FIG. 5.

The electrical junction box 1 according to the embodiment of the present invention includes a box body 10 as an upper box section whose lower part 10f is open, and a lower cover section 40 as a lower box section whose upper part 40c is open and is mounted to cover the lower part 10f of the box body 10. A side cover section 30 is attached to the box body 10 to shield a groove part 10e on the box body in which a connector 12a of an electrical connection member 12 is accommodated.

The box body 10 will now be described.

The box body 10 forms a main accommodation part of the electrical junction box 1 in which electrical components 11a such as connectors, relays, fuses, or the like are accommodated.

The box body 10 is made of electrically insulating synthetic resin, and has an outer contour that is defined by a barrel type outer wall. The box body has a partition wall 10a which allows a cassette block 11, in which electrical components 11a are mounted, to be dividedly accommodated.

The box body 10 has, on the outer surface thereof, a groove part 10e which extends linearly from an upper end to a lower end thereof and in which the connector 12a of the electrical connection member 12 is accommodated.

As shown in FIG. 1, the electrical connection member 12 is an electric wire having a terminal, i.e., the connector 12a. The connector 12a is accommodated in the groove part 10e on the box body 10. One end of the electrical connection member is connected to the electrical component 11a which is mounted in the cassette block 11 in the electrical junction box 1, and the other end of the electrical connection member is drawn from a groove part 43 on the lower cover section 40 and is connected to an external power supply that is not shown in the drawings.

Although the electrical connection member 12 is illustrated as an electric wire having a terminal, the electrical connection member is not limited thereto, but may employ other components that can electrically connect the electric part 11a in the electrical junction box 1 to an external power supply.

The side cover section 30 slides along the groove part 10e on the box body 10 from the upper side toward the lower side and is attached to the groove part 10e.

Next, the upper cover section 20 will be described.

As shown in FIG. 2, the upper cover section 20 has a box shape whose bottom is open, and is mounted to the box body 10 when a lower edge 20a thereof covers an upper edge of the box body 10.

Next, the side cover section 30 will be described.

As shown in FIGS. 1 to 3, the side cover section 30 has an engaging part 32 (see FIG. 3) for fixing the electrical connection member 12 to a planar base part 31 that serves as a main body part.

The engaging part 32 for the electrical connection member is provided on a surface 31a on the side where the planar base part 31 is attached to the box body 10. Thus, when the side cover section 30 is attached to cover a channel opening of the box body 10, the connector 12a of the electrical connection member 12 is accommodated in the groove part 10e on the box body 10.

Next, the lower cover section 40 will be described.

The lower cover section 40 has a box shape which has an opened upper part 40c, a substantially rectangular bottom wall part 41, and a surrounding side wall part 42 which stands from a circumference of the bottom wall part 41. The lower cover section 40 is mounted to the box body 10 when an upper part 40a thereof covers a lower part 10c of the box body 10. That is, the lower cover section 40 is mounted, as the lower box section, to the lower part of the box body 10 as the upper box section.

As shown in FIGS. 5 and 6, the lower cover section 40 is mounted to the box body 10 to cover the lower part 10f of the box body 10. The lower cover section 40 has an abutment protrusion part 50 which protrudes from an outer surface 40b thereof and has an abutment surface 51 that abuts against an edge surface of a lower part 10g of the box body 10 when mounted to the box body 10.

As shown in FIG. 1, the abutment protrusion part 50 serves as a support leg part that protrudes downwards below the bottom surface of the lower cover section 40 to support and fix the lower cover section 40 to the inside of an engine room. Two abutment protrusion parts 50 are provided on an outer surface of one of surrounding side walls 42 that are a portion of the outer surface 40b of the lower cover section 40.

Thus, the abutment protrusion part 50 supports the box body 10 by supporting and fixing the lower cover section 40 to the inside of the engine room as the support leg room as well as by abutment against the edge surface of the lower part 10g of the box body 10.

Each of the abutment protrusion parts 50 that is provided at two places has an inclined surface 52 at a place where the abutment protrusion part 50 further extends outwards from the box body 10 in the direction parallel with the abutment surface 51. The inclined surface 52 connects to the abutment surface 51 and is inclined downwards from the abutment surface 51.

The inclined surface 52 connects to the abutment surface 51 at a position that is collinear to the outer surface 10d of the box body 10, or that is slightly inwards from the outer surface 10d, in the direction parallel with the abutment surface 51.

In order to securely form the inclined surface 52 at a position where the abutment protrusion part 50 further extends outwards from the outer surface of the upper box section, it is preferred that the inclined surface 52 connects to the abutment surface 51 from a position that is slightly inward from the outer surface 10d of the box body 10.

The inclined surface 52 has a through-hole 53 that passes through the abutment protrusion part 50 in a vertical direction.

In the electrical junction box 1, for example, when water is poured over the abutment surface 51 to wash an engine room, as shown in FIG. 6, the water is guided downwards from the lower cover section 40 while flowing along the inclined surface 52, or otherwise bounces out of the electrical junction box 1 from the inclined surface.

Further, when water is poured over the through-hole 53, the water is guided downwards from the lower cover section 40 while escaping through the through-hole 53.

In the electrical junction box 1 according to the embodiment of the present invention, when water is poured over a part of the abutment protrusion part 50 that further protrudes outwards from the box body 10 in the direction parallel with the abutment surface 51 of the abutment protrusion part 50, the water is guided downwards from the lower box section 40 while flowing along the inclined surface 52, or otherwise bounces out of the inclined surface 52 outwards from the electrical junction box 1, thereby preventing water from infiltrating into the electrical junction box 1 through the abutment surface 51 of the lower box section 40 which comes into contact with the edge surface of the lower part 10g of the box body 10.

In the electrical junction box 1 according to the embodiment of the present invention, when water is poured over a part of the abutment protrusion part 50 that further protrudes outwards from the box body 10 in the direction parallel with the abutment surface 51 of the abutment protrusion part 50, the water is guided downwards from the lower box section 40 while passing through the through-hole 53, thereby further improving the waterproofing effect.

In the electrical junction box 1 according to the embodiment of the present invention, the inclined surface 52 connects to the abutment surface 51 at a position that is collinear to the outer surface 10d of the box body 10, or that is slightly inwards from the outer surface 10d, in the direction parallel with the abutment surface 51, thereby securely forming the inclined surface 52 at a position where the protrusion part further protrudes outwards from the box body 10 in the direction parallel with the abutment surface 51.

Although the embodiments of the present invention have illustrated that the electrical junction box 1 includes the upper cover section 20, the box body 10, the side cover section 30, and the lower cover section 40, the present invention is not limited to the embodiments. Other electrical junction boxes may be also employed if the electrical junction box includes an upper box section having an opened lower part, and a lower box section whose upper part is open and is mounted to the lower side of the upper box section, and which has an abutment protrusion part which protrudes from an outer surface thereof and has an abutment surface that abuts against an edge surface of the lower part of the upper box section when mounted to the upper box section. For example, there may be an electrical junction box in which the upper cover section 20 serves as an upper box section relative to the box body 10, and the abutment protrusion part is formed on the box body 10 that serves as a lower box section relative to the upper cover section 20. Alternatively, there may be an electrical junction box in which the upper cover section 20 serves as an upper box section, and the box body 10 and the lower cover section 40 are integrally formed and serve as a lower box section.

Although the embodiments of the present invention have illustrated that the electrical junction box 1 has the abutment protrusion part 50 that serves as a support leg to fix the lower cover section to the inside of an engine room, the present invention is not limited thereto. The abutment protrusion may for example be a part that protrudes from the outer surface of the lower cover section and has an abutment surface that abuts against an edge surface of the lower part of the upper box section. For example, the abutment protrusion part may be a reinforcing part that protrudes from the lower cover section only to reinforce the lower cover section without having a support function.

Although the present invention contrived by the inventors has been described in detail based on the above-mentioned embodiments, the present invention is not limited thereto, and various modifications are possible, without departing from the scope and spirit of the present invention.

This application is based upon and claims the benefit of priority of Japanese Patent Application No. 2012-129833 filed on Jun. 7, 2012, the contents of which are incorporated herein by reference in its entirety.

What is claimed is:

1. An electrical junction box, comprising:
an upper cover section having an opened lower part; and
a lower cover section whose upper part is open and is mounted to the lower part of the upper cover section, wherein the lower cover section includes an abutment protrusion part which protrudes from an outer surface of the lower cover section and has an abutment surface that abuts against an edge surface of the lower part of the upper cover section when the lower cover section is mounted to the upper cover section,
wherein the abutment protrusion part includes an inclined surface at a place where the abutment protrusion part further extends outwards at least than an outer surface of the upper cover section in a direction parallel with the abutment surface, the inclined surface connecting to the abutment surface and being inclined downwards from the abutment surface, and
wherein water is guided downwards from the lower cover section along the inclined surface outward from the junction box thereby preventing water from infiltrating past the abutment surface into the junction box.

2. The electrical junction box according to claim 1, wherein a through-hole is formed that passes through the abutment protrusion part in a vertical direction.

3. The electrical junction box according to claim 1, wherein the inclined surface connects to the abutment surface at a position that is slightly inwards from the outer surface of the upper cover section in the direction parallel with the abutment surface.

* * * * *